(12) United States Patent
Son et al.

(10) Patent No.: US 7,938,875 B2
(45) Date of Patent: May 10, 2011

(54) APPARATUS FOR SEPARATING OIL FROM BLOW-BY GAS OF ENGINE

(75) Inventors: Young-Ki Son, Namyangju-si (KR); Hee-Deog Kim, Seoul (KR)

(73) Assignee: LG Chem, Ltd. (KR)

( * ) Notice: Subject to any disclaimer, the term of this patent is extended or adjusted under 35 U.S.C. 154(b) by 241 days.

(21) Appl. No.: 12/159,707

(22) PCT Filed: Dec. 26, 2006

(86) PCT No.: PCT/KR2006/005691
§ 371 (c)(1),
(2), (4) Date: Dec. 1, 2008

(87) PCT Pub. No.: WO2007/075018
PCT Pub. Date: Jul. 5, 2007

(65) Prior Publication Data
US 2009/0126575 A1    May 21, 2009

(30) Foreign Application Priority Data

Dec. 29, 2005 (KR) .................. 10-2005-0133170
Dec. 20, 2006 (KR) .................. 10-2006-0131114

(51) Int. Cl.
*B01D 45/00* (2006.01)
(52) U.S. Cl. .......... 55/445; 55/446; 55/457; 123/198 E; 123/572
(58) Field of Classification Search .............. 55/445, 55/446, 457, DIG. 28; 123/198 E, 572
See application file for complete search history.

(56) References Cited

U.S. PATENT DOCUMENTS

| 5,957,118 A | 9/1999 | Tateno et al. |
| 7,080,636 B2 * | 7/2006 | Knaus et al. .................. 123/572 |

FOREIGN PATENT DOCUMENTS

| CN | 1426734 | 7/2003 |
| JP | 7-243318 | 9/1995 |
| JP | 2005-201080 | 7/2005 |
| KR | 10-2005-0045330 | 5/2005 |

OTHER PUBLICATIONS

International Search Report for PCT/KR2006/005691 dated Mar. 27, 2007.
Written Opinion for PCT/KR2006/005691 dated Mar. 27, 2007.

* cited by examiner

*Primary Examiner* — Robert A Hopkins
(74) *Attorney, Agent, or Firm* — Cantor Colburn LLP

(57) ABSTRACT

The present invention relates to a variable apparatus for separating oil from blow-by gas in an engine. More particularly, the variable apparatus of the present invention is installed in a baffle compartment of a cylinder head cover of the engine, and includes a partition wall (10), a cover (20) and an elastic member (30) that elastically supports the cover (20), thus separating oil from blow-by gas generated in the engine. The variable apparatus having the above-mentioned construction actively responds to the flow speed of the blow-by gas, thus markedly enhancing the ability to separate oil from blow-by gas even when the engine is operating at high speed.

9 Claims, 12 Drawing Sheets

APPARATUS FOR SEPARATING OIL FROM BLOW-BY GAS OF ENGINE

TECHNICAL FIELD

The present invention relates, in general, to variable apparatuses for separating oil from blow-by gas in engines and, more particularly, to a variable apparatus, which is installed in a baffle compartment of a cylinder head cover of an engine to separate oil from blow-by gas generated in the engine.

BACKGROUND ART

As well known to those skilled in the art, while an engine is running, combustion gas and unburned gas, which are generated in the explosion stroke of the engine, leak into a crankcase through a fine gap between a piston and a cylinder liner. This gas is called "blow-by gas".

The blow-by gas, which is drawn into the crankcase, is guided to a cylinder head cover, which is disposed on top of the cylinder head of the engine. The blow-by gas, which is guided to the cylinder head cover, is then guided to an intake system of the engine and is thus re-burnt.

However, during this process, oil mixes with the blow-by gas. As the amount of oil that mixes with the blow-by gas is increased, the consumption rate of oil in the engine increases, the durability of the engine is deteriorated, and the amount of harmful exhaust gas is increased. As such, many problems are caused.

To solve the above-mentioned problems, an oil separating apparatus, which is provided on the path in the cylinder head along which the blow-by gas travels, was proposed.

DISCLOSURE

Technical Problem

Figure 1:
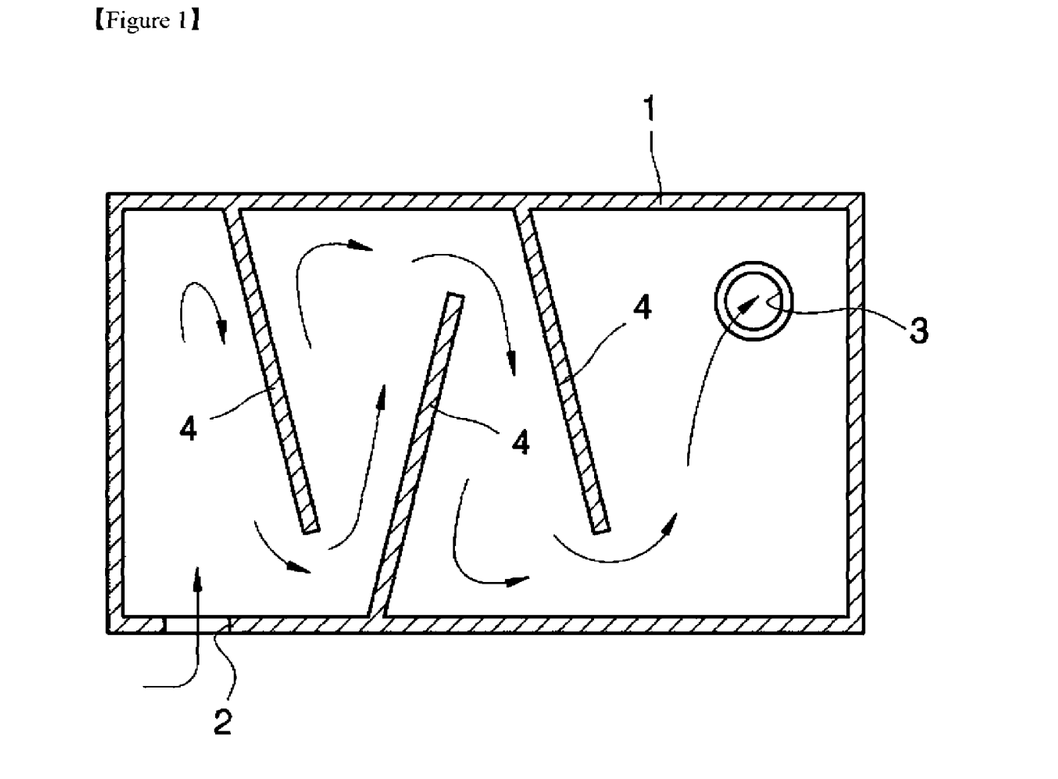
FIG. 1 is a schematic view showing a conventional apparatus for separating oil from blow-by gas in an engine.

As shown in FIG. 1, in the conventional apparatus for separating oil from blow-by gas, an inlet 2 and an outlet 3 for blow-by gas are formed in a baffle compartment 1. Furthermore, several partition walls 4 are alternately disposed in the baffle compartment 1 such that the path along which blow-by gas passes has a zigzag structure. Thus, oil contained in blow-by gas falls due to its own weight or sticks to the partition walls 4. Thereafter, the separated oil is discharged through a separate oil discharge passage (not shown). However, the conventional fixed-type oil separating apparatus having the stationary partition walls is problematic in that the efficiency with which oil is separated from blow-by gas varies depending on the speed at which blow-by gas passes through the baffle compartment 1, that is, depending on the conditions in the engine.

In an effort to overcome the problems experienced with the conventional art, an apparatus for separating oil from blow-by gas, which includes movable impactors, which are rotatably provided around an inlet and an outlet of a baffle compartment, an actuator for rotating the movable impactors, and a controller that operates the actuator depending on the operation conditions of the engine, was proposed in Korean Patent Laid-open Publication No. 2005-0045330. However, the variable oil separating apparatus has problems in that, because several separate electric components, such as the actuator, the controller and a sensor for detecting the operation conditions of the engine, are required, the manufacturing costs are increased, and, when taking high-temperature and high-pressure conditions of the engine into account, the reliability and durability of the actuator and controller are markedly reduced.

Furthermore, it is very difficult to quickly control the actuator in response to the operation conditions of the engine, which vary rapidly depending on the driving conditions of the vehicle. In addition, when the engine is operated at high speed, the pressure of blow-by gas is increased and the flow rate thereof is thus increased. Then, the load of the actuator is also increased. Therefore, there is a disadvantage in that an actuator having high capacity is required.

Moreover, the movable impactor has a hinged door structure, that is, it is too simple. Therefore, because the contact area between the movable impactor and blow-by gas, which passes through the movable impactor, is relatively small, the oil separating function is not reliably conducted. As well, the shape of the contact surface is fixed rather than changing depending on the pressure of blow-by gas. As a result, there is a problem in that, when the engine is operating at high speed, the oil separating ability is reduced.

Technical Solution

Accordingly, the present invention has been made keeping in mind the above problems occurring in the prior art, and an object of the present invention is to provide a variable apparatus for separating oil from blow-by gas in an engine in which, when the engine is operating at low speed, relatively low negative pressure is applied to blow-by gas, and, when the engine is operating at high speed, the amount of negative pressure applied to blow-by gas is increased in order to actively respond to the speed at which blow-by gas flows, thus having markedly enhanced ability to separate oil from blow-by gas even when operating at high speed.

Another object of the present invention is to provide a variable apparatus for separating oil from blow-by gas in an engine in which, in the case where the ability to separate oil from the blow-by gas is reduced when the flow speed of blow-by gas is low, blow-by gas is accelerated and rotated to enhance the oil separating ability and the pressure in a crankcase is prevented from becoming positive pressure by reducing a difference in pressure, and in which, when the engine is operating at high speed, the area of the partition wall that contacts blow-by gas is increased to enhance the oil separating ability and the difference in pressure is increased such that the pressure in the crankcase can fall within a desired range.

Advantageous Effects

The present invention provides a variable apparatus for separating oil from blow-by gas in an engine which appropriately responds to the speed at which blow-by gas flows, so that the efficiency of separation of oil from blow-by gas can be increased even when the blow-by gas flows at a high speed. Furthermore, in the present invention, because an elastic member having a spiral shape has a simple structure and the number of parts is reduced, the reliability of the assembled apparatus is enhanced, the cost of manufacturing the apparatus is reduced, and the durability thereof is markedly enhanced. In addition, in response to the pressure of blow-by gas, the elastic member extends or contracts and thus guides the rotary flow of blow-by gas and, simultaneously, the shape of the contact surface with the blow-by gas is changed, so that the ability to separate oil from blow-by gas can be increased.

BEST MODE

Hereinafter, variable apparatuses for separating oil from blow-by gas in engines according to preferred embodiments of the present invention will be described in detail with reference to the attached drawings.

First Embodiment

Figure 2:
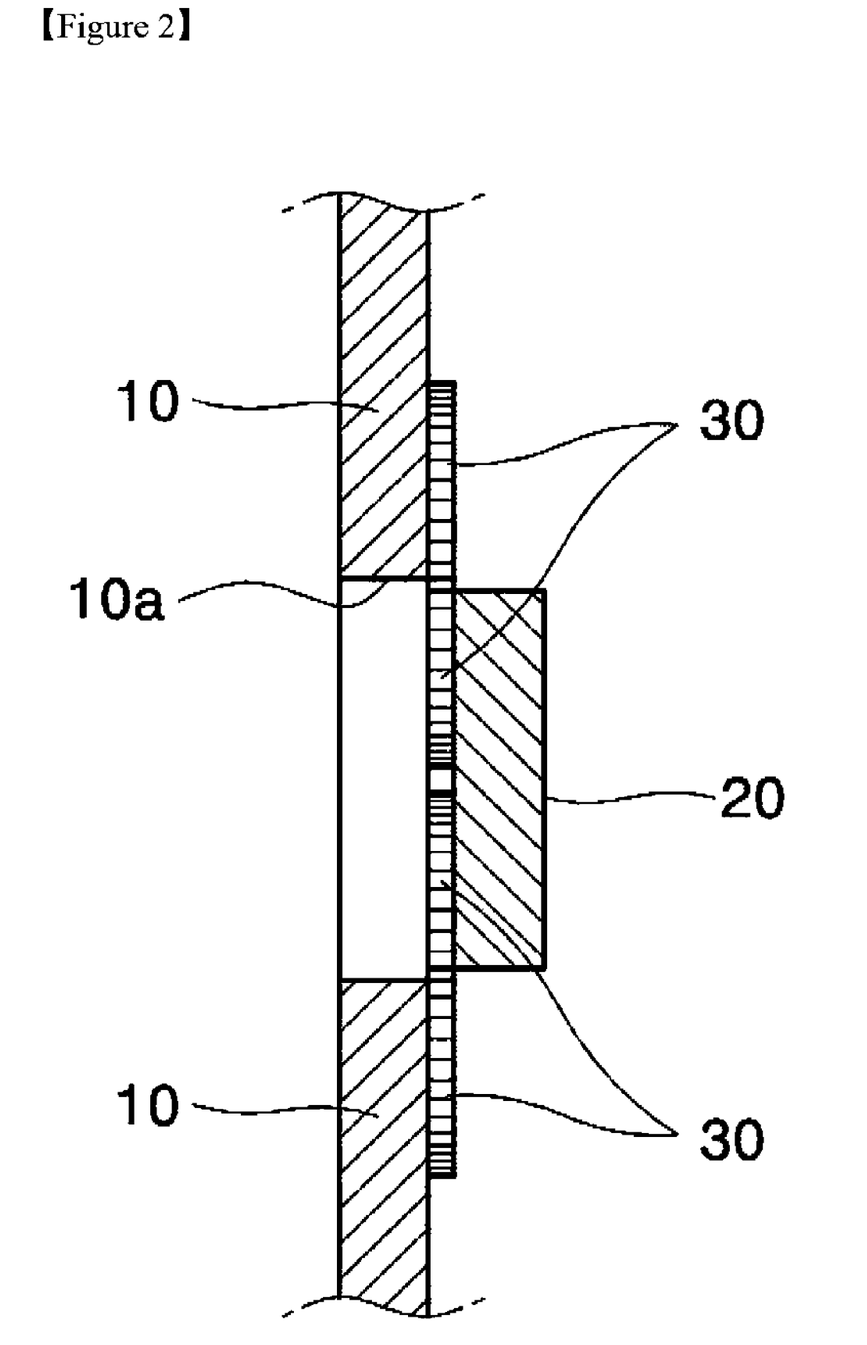
FIG. 2 is a sectional view showing a part of a variable apparatus for separating oil from blow-by gas in an engine which is not in a varied state, according to a first embodiment of the present invention.

As shown in FIG. 2, a variable apparatus for separating oil from blow-by gas in an engine according to a first embodiment of the present invention is installed in a baffle compartment of a cylinder head cover of the engine, and includes a partition wall 10, a cover 20 and a plurality of elastic members 30.

Figure 6:
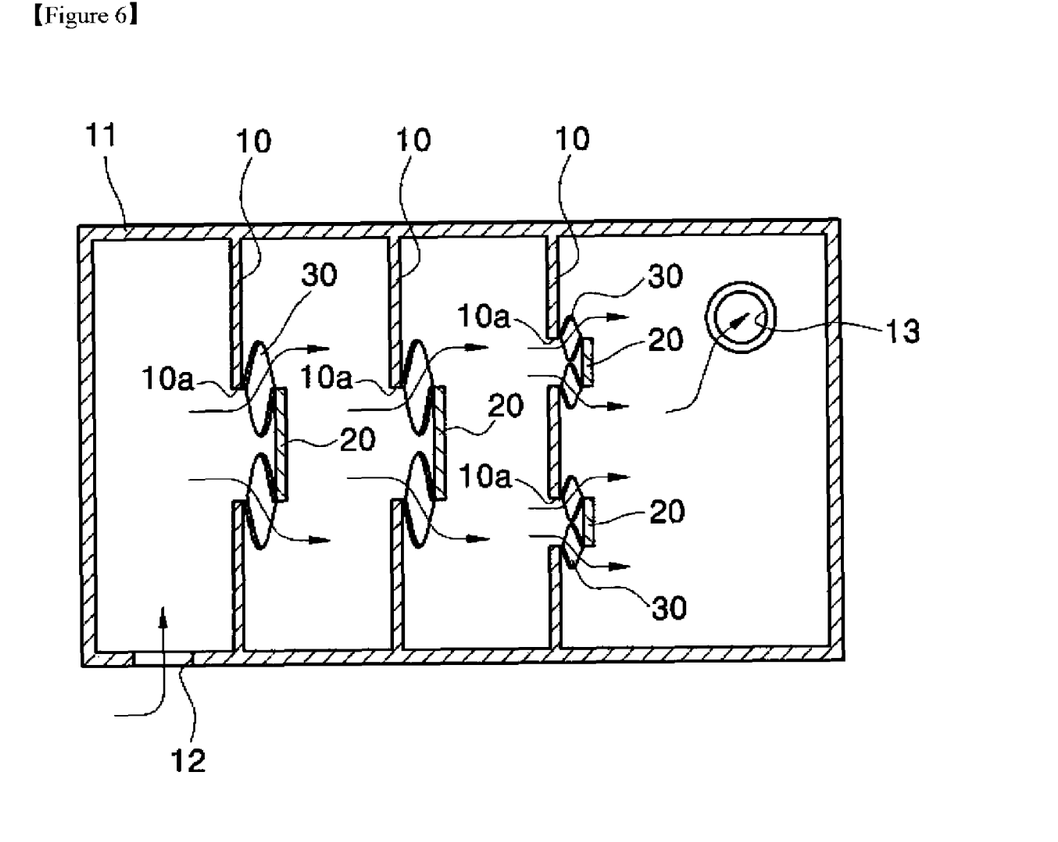
FIG. 6 is a schematic view showing an example of a baffle compartment in which variable apparatuses for separating oil from blow-by gas according to the first embodiment are installed.

Here, the partition wall 10 has a blow-by gas passing hole 10a therein. The single partition wall 10 may be provided in the baffle compartment 11. Alternatively, as shown in FIG. 6, several partition walls 10 may be provided in the baffle compartment 11. Furthermore, as shown in FIG. 2, the cover 20 has a shape corresponding to that of the passing hole 10a to close the passing hole 10a. Preferably, the shape and size of the cover 20 are optimally determined such that the cover 20 is appropriately moved away from the passing hole 10a of the partition wall 10 depending on the change in pressure of blow-by gas while the engine is operated at low speed or at high speed.

That is, the pressure of blow-by gas, which is applied to the cover 20, pertains to the area of the cover 20. The area of the cover 20 can be optimized through testing. Meanwhile, the elastic members 30 are interposed between the partition wall 10 and the cover 20 and are made of elastic material which can be changed in shape such that the cover 20 is moved away from the partition wall 10 by a predetermined distance depending on the pressure of blow-by gas supplied from the engine, and passages are thus defined.

Figure 3:
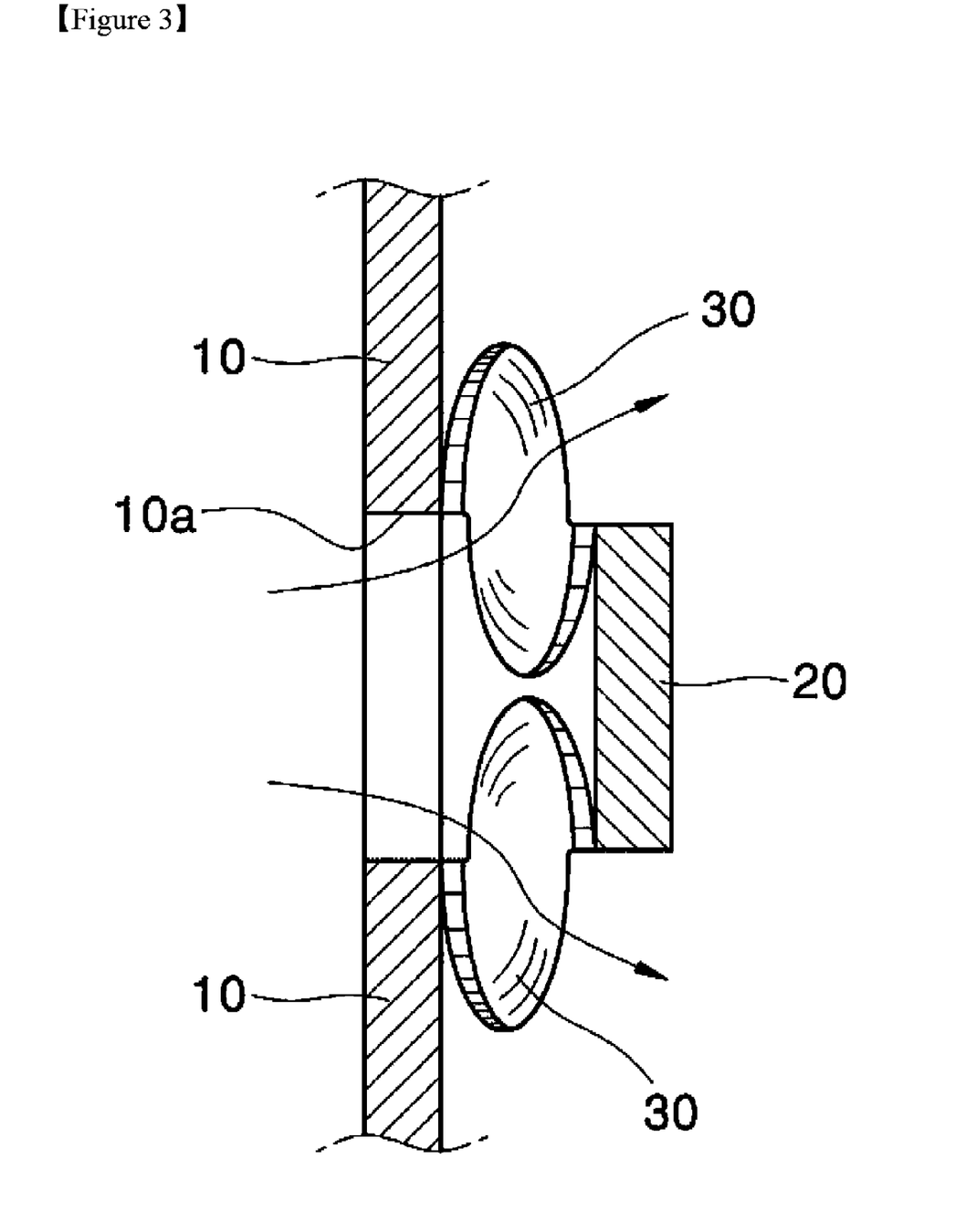
FIG. 3 is a sectional view showing the part of the variable apparatus of FIG. 2 which is operating at low speed.
Figure 4:
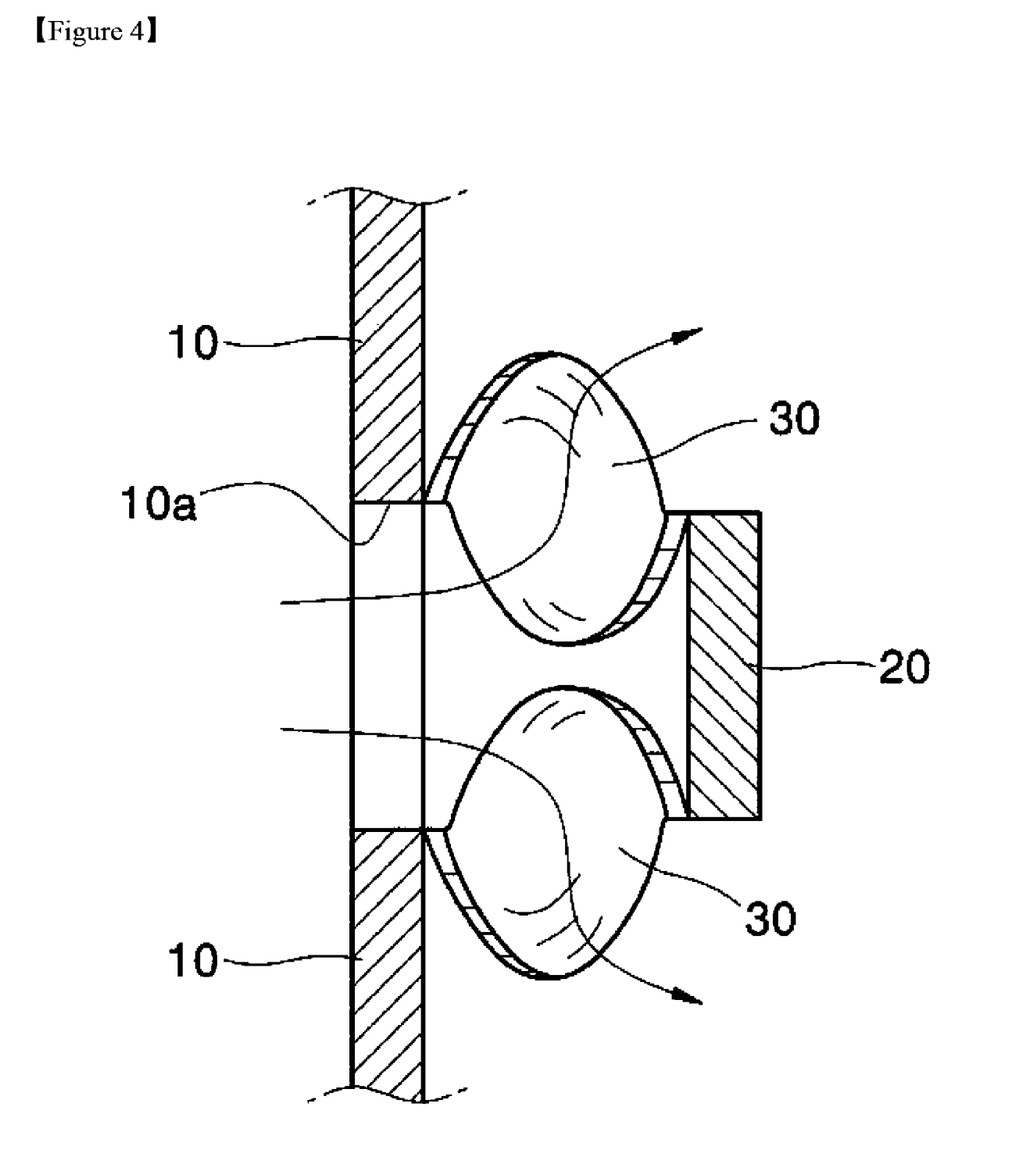
FIG. 4 is a sectional view showing the part of the variable apparatus of FIG. 2 which is operating at high speed.
Figure 5:
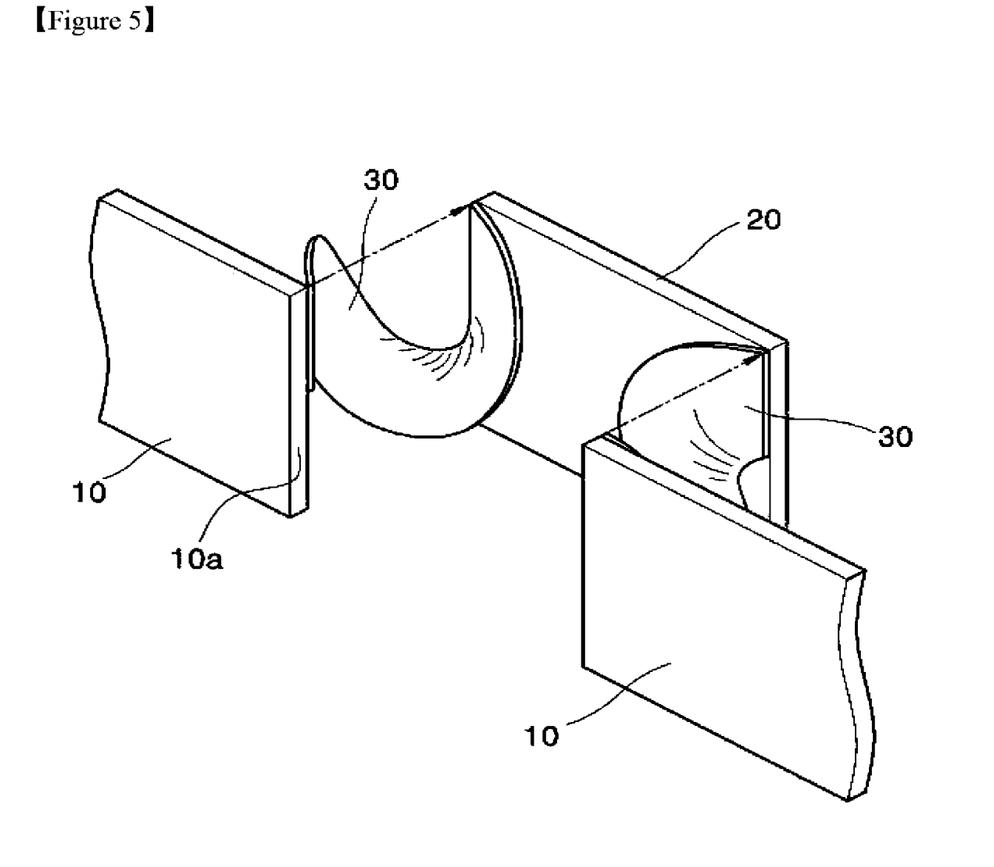
FIG. 5 is a perspective view of FIG. 4.

Particularly, in the first embodiment of the present invention, as shown in FIGS. 3, 4 and 5, each elastic member 30 is a spiral elastic plate, which has a surface twisted into a spiral having a predetermined angle, so that, when the elastic member 30 is elastically extended, blow-by gas is spirally moved under the guidance of the elastic member 30.

As shown in FIGS. 2 through 5, two elastic members 30 may be symmetrically provided at opposite sides of the passing hole 10a of the partition wall 10. Alternatively, three, four, five or more elastic members 30 may be provided around a single passing hole 10a.

Particularly, in the first embodiment, the angle at which the elastic member 30 is twisted and the number of twists of the elastic member 30 may be variously changed. Furthermore, several elastic members 30 may be installed parallel to each other around the passing hole 10a.

Here, the elasticity of the elastic member 30 can be also optimally designed through testing.

In FIG. 5, although the elastic member 30 is illustrated as being twisted once, it may be twisted two or more times.

The operation of the variable apparatus for separating oil from blow-by gas in the engine according to the first embodiment will be explained herein below. As shown in FIG. 2, when the engine is in a stopped state or in a lowest-speed state, because the speed at which blow-by gas flows is zero or minimal, the cover 20 closes the passing hole 10a of the partition wall 10, or leaves it slightly open. Thus, the function of separating oil using the weight of the oil is smoothly conducted.

As shown in FIG. 3, when the engine is operating at low speed, because blow-by gas flows at low speed, the cover 20, to which the pressure of the blow-by gas is applied, is spaced apart from the passing hole 10a by a relatively short distance. At this time, the speed at which blow-by gas flows is increased, so that, even when the engine is running at a low speed, the oil separating function can be reliably conducted.

As shown in FIGS. 4 and 5, when the engine is operating at high speed, because the amount of blow-by gas is increased, blow-by gas flows at high speed. Therefore, the blow-by gas is applied to the cover 20 at high pressure, so that the cover 20 is spaced apart from the passing hole 10a of the partition wall 10 by the maximum distance. At this time, the speed at which blow-by gas flows is maximized, so that, even when the engine is running at a high speed, the oil separating function can be reliably conducted.

Here, as the speed of the engine is increased from FIG. 2 to FIG. 4 through FIG. 3, the length of the passage along which blow-by gas contacts the elastic members 30 is increased and, simultaneously, rotary flow of the blow-by gas is induced, thus reliably conducting the oil separating function.

Therefore, the variable apparatus for separating oil from blow-by gas according to the first embodiment can reliably conduct the variable oil separating function using the elastic members 30 having simple structures even without having a separate actuator or controller, unlike the conventional art. Furthermore, because the length of the passage along which the blow-by gas contacts the elastic members 30 is variable, the oil separating ability can be markedly increased.

Meanwhile, FIG. 6 is a schematic view showing an example of a baffle compartment 11 in which variable apparatuses for separating oil from blow-by gas according to the first embodiment are installed.

As shown in FIG. 6, several partition walls 10 may be provided in the baffle compartment 11. One or at least two covers 20 and elastic members 30 may be installed in each partition wall 10.

Therefore, blow-by gas, which is drawn into the baffle compartment 11 through an inlet 12, passes through the several passing holes 10a of the partition walls 10. During this process, oil is separated from the blow-by gas both by the elastic members 30 and by the covers 20. Thereafter, the blow-by gas is supplied into the intake system of the engine through an outlet 13 of the baffle compartment 11.

Here, the design of the numbers and the positions of the partition walls 10, the covers 20 and the elastic members 30 may be variously changed depending on the outflow rate of blow-by gas, the shape of the baffle compartment 11, and the characteristics of the engine. The present invention is not limited to the above-mentioned embodiment, and those skilled in the art will appreciate that various modifications, additions and substitutions are possible, without departing from the scope and spirit of the invention.

Figure 7:
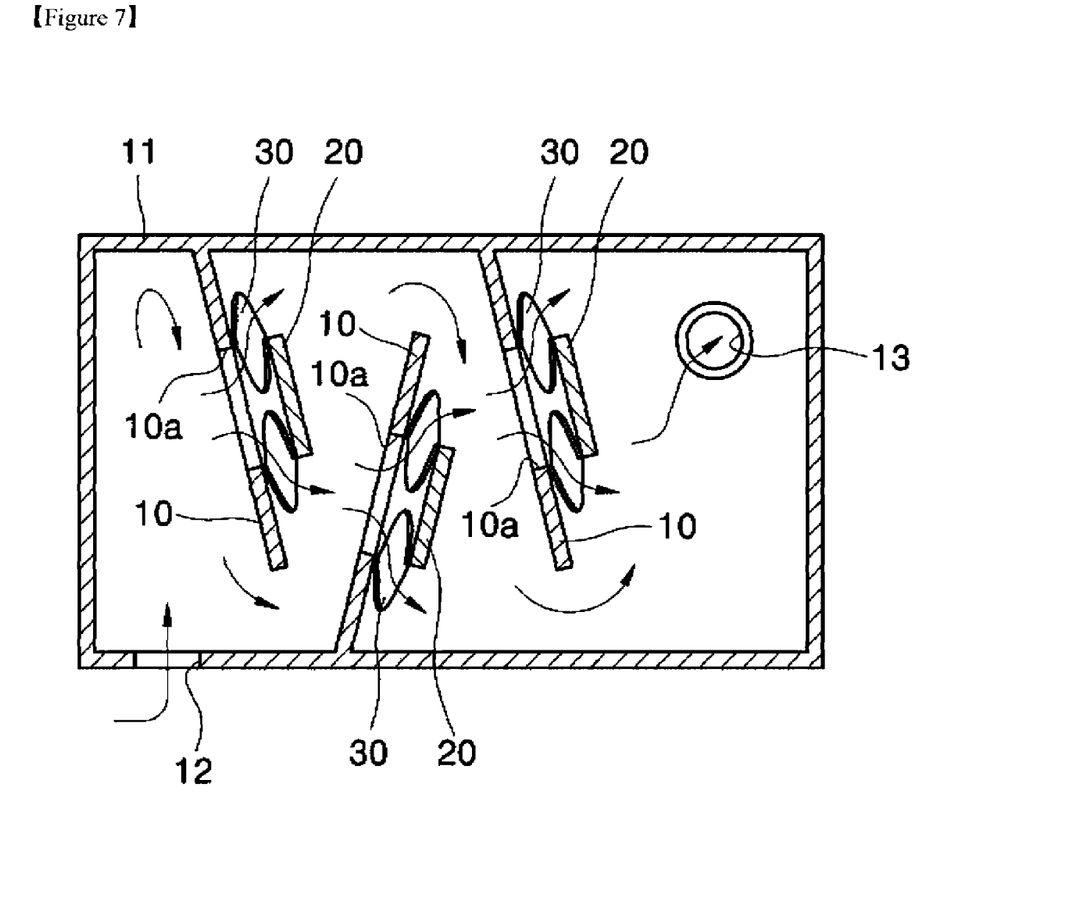
FIG. 7 is a view corresponding to FIG. 6, but showing another example of a baffle compartment in which variable apparatuses for separating oil from blow-by gas according to the first embodiment are installed.

For example, as shown in FIG. 7, partition walls 10 may be constructed in a baffle compartment 11 in the same manner as that of the partition walls 4 of the conventional baffle compartment 1 of FIG. 1. The covers 20 and the elastic members 30 of the present invention are installed in such partition walls 10. This variable apparatus for separating oil from blow-by gas is constructed such that the covers 20 maintain the closed state when the engine is operating at low speed, and only when the engine is operating at high speed are the covers 20 opened. When the engine is running at a low speed, even though the covers 20 are closed, because the amount of blow-by gas is relatively small, blow-by gas can sufficiently pass through the space defined between the partition walls 10, and oil can be reliably separated from the blow-by gas.

When the engine is running at a high speed, the amount of blow-by gas is increased. In response to this, the covers 20 are opened, so that blow-by gas passes through the space defined between the partition walls and, simultaneously, passes through the passing holes 10a, which form bypass passages. Therefore, oil can be reliably separated from the blow-by gas.

Second Embodiment

The operation of the second embodiment of the present invention for increasing the oil separation efficiency is conducted in a manner opposite to that of the first embodiment. In detail, in the case of the first embodiment described above, when blow-by gas flows at low speed, oil is separated from the blow-by gas by its own weight. However, depending on changes in parameters, such as the operating conditions of the vehicle, the kind of oil and the characteristics of the engine, the case in which, when blow-by gas flows at low speed, oil is not as easily separated from the blow-by gas as when the blow-by gas flows at high speed, may arise.

The second embodiment makes it possible to easily separate oil from blow-by gas even in the above-mentioned case.

Hereinafter, the second embodiment of the present invention will be described in detail with reference to FIGS. 8 through 10.

Figure 8:
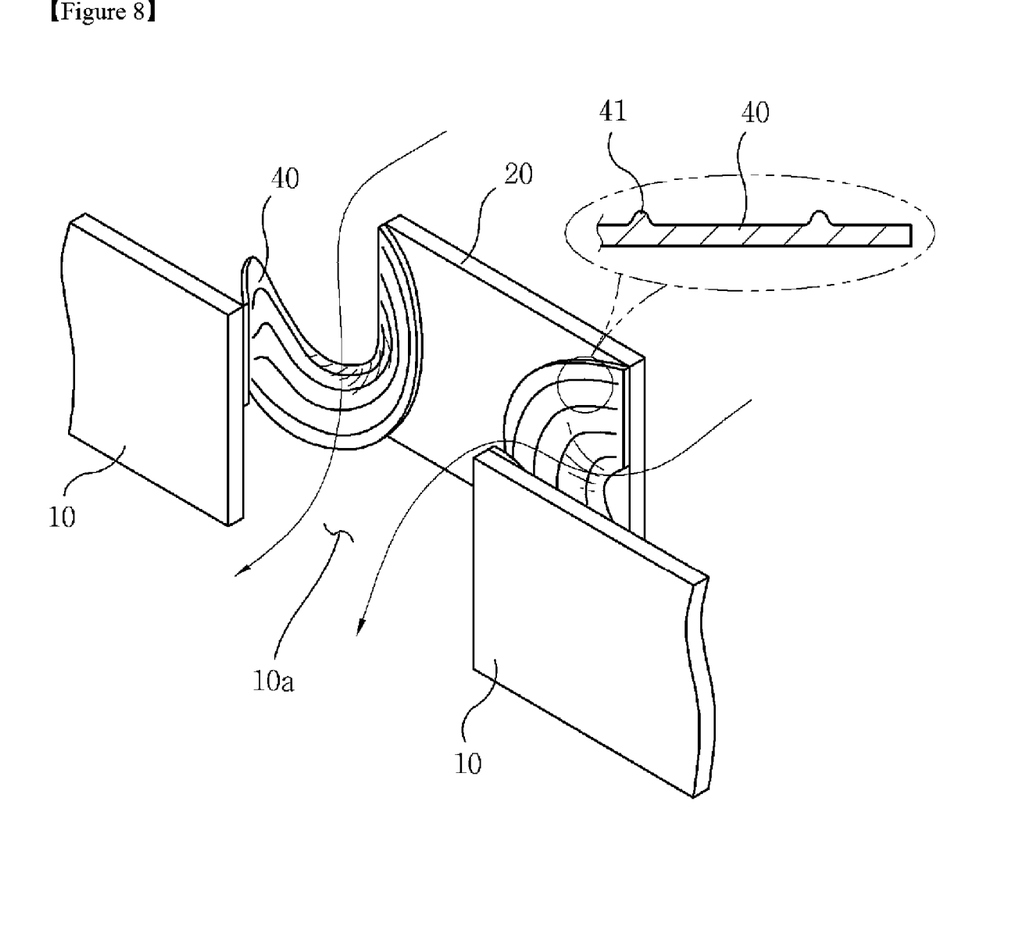
FIGS. 8 through 10 are perspective views showing a process of varying a variable apparatus for separating oil from blow-by gas in an engine, according to a second embodiment of the present invention.

As shown in FIG. 8, the general construction of the second embodiment is similar to that of the first embodiment. However, unlike the first embodiment, in which, when the pressure of blow-by gas is increased, that is, when the engine is operating at high speed, the cover 20 that closes the passing hole 10a under normal conditions is spaced apart from the passing hole 10a, and in which, when the pressure of blow-by gas is reduced, that is, when the engine enters the low-speed state, the cover 20 is returned to its original state by the elasticity of the elastic members 30, in the second embodiment, when blow-by gas flows at low speed, the cover 20 maintains its position spaced apart from a passing hole 10a, when blow-by gas flows at high speed, the cover 20 closes the passing hole 10a, and when blow-by gas flows at low speed again, the cover 20 is returned to its original state, that is, to the spaced apart position, by the elasticity of elastic members 40.

That is, the elastic member 40 of the second embodiment is biased in the opposite direction as the elastic member 30 of the first embodiment.

In the second embodiment having the above-mentioned construction, when operating at low speed, blow-by gas is rotated and accelerated while passing through the passing holes 10a of the partition walls 10 and between the partition walls 10, thereby the efficiency at which oil is separated from blow-by gas is increased.

The well-known phenomenon stating that fluid flowing in a large flow area increases in speed when entering a small flow area is known as Bernoulli's theorem.

In other words, when blow-by gas that flows in a large flow area passes through the relatively narrow passage defined between the cover 20 and the passing hole 10a, the speed of the blow-by gas is increased. Thanks to this principle, even in the condition in which oil is not easily separated from blow-by gas when the engine is operating at low speed, this embodiment can achieve the purpose of increasing the efficiency at which oil is separated from blow-by gas.

Meanwhile, each elastic member 40 has a shape such that it is twisted into a spiral having a predetermined angle. The elastic member 40 serves to spirally rotate and accelerate blow-by gas. Therefore, in the same manner as the first embodiment, the efficiency at which oil is separated from blow-by gas is further increased by the increased speed and rotation of blow-by gas.

Preferably, flow guides 41, which guide the flow of blow-by gas, may protrude from the elasticity member 40, so that, when blow-by gas flows along the flow guides 41, the rotation thereof is further accelerated.

As describe above, in the second embodiment, blow-by gas, which flows at low speed, is rotated and accelerated by the elastic members 40, which elastically maintain the distance between the cover 20 and the blow-by gas hole 10a, thus increasing the efficiency at which oil is separated from blow-by gas. Hereinafter, the fact, in which, even when blow-by gas flows at high speed, the efficiency at which oil is separated from blow-by gas can be increased in response to this, will be explained.

Figure 9:
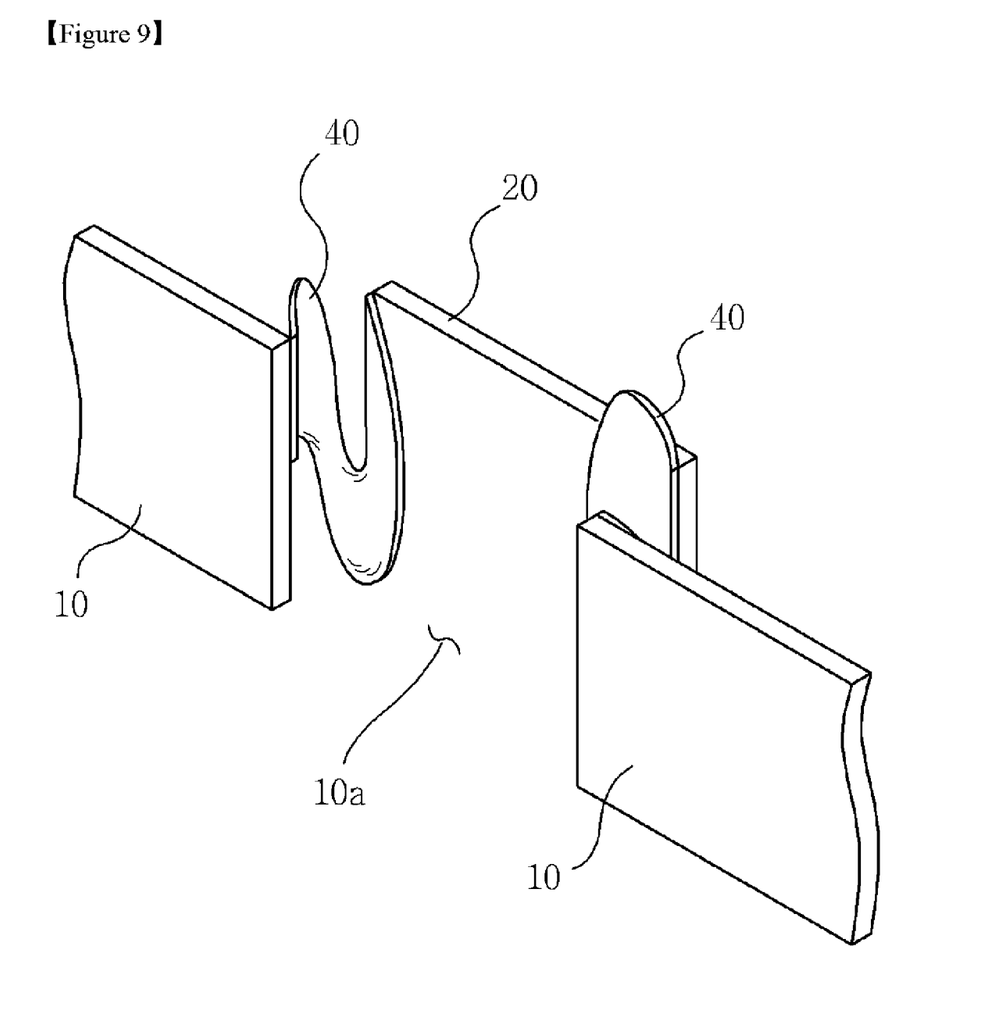
Figure 10:
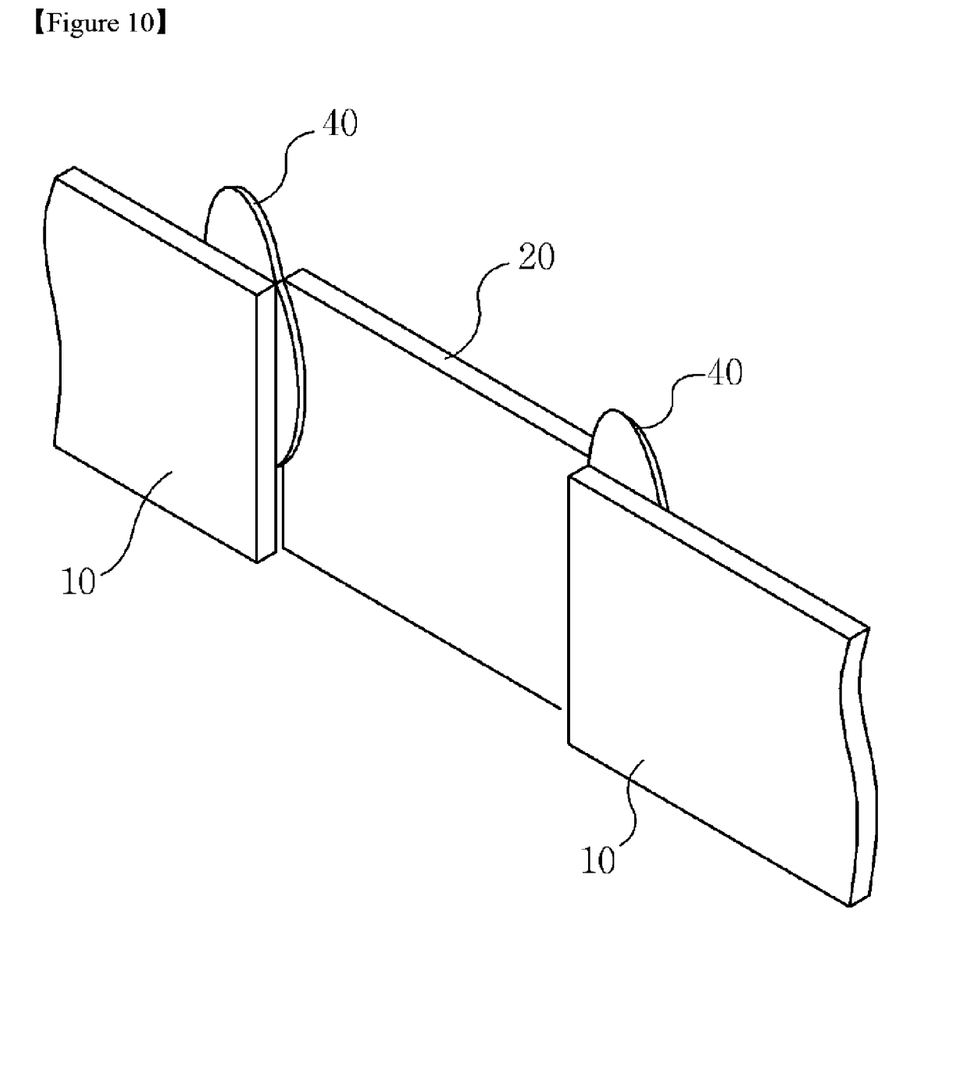

As shown in FIGS. 9 and 10, when blow-by gas flows at high speed, the pressure at which blow-by gas pushes the cover 20 increases. When high-speed blow-by gas overcomes the elasticity of the elastic members 40, which space the cover 20 apart from the passing hole 10a, the cover 20 is moved by the pressure of the blow-by gas towards the passing hole 10a and thus closes the passing hole 10a. FIG. 9 illustrates the cover 20 moved towards the passing hole 10a by blow-by gas, the flow speed of which is increased. FIG. 10 illustrates the passing hole 10a, which is completely covered with the cover 20 by the increased pressure of the blow-by gas.

Thanks to this structure, even when blow-by gas flows at high speed, the efficiency at which oil is separated from blow-by gas can be increased.

In detail, when blow-by gas strikes the cover 20 at high speed, the cover 20 moves towards the passing hole 10a and closes it. Then, the area of the partition wall 10 that is struck by the blow-by gas is increased. As a result, the oil separating efficiency is increased by the increased area of the partition wall 10. Here, as the shape of the elastic member 40 is changed, because the gap between the partition wall 10 and the cover 20 is reduced, acceleration and rotary flow of blow-by gas are induced, so that the oil separating efficiency can be further increased. Furthermore, during the process in which the cover 20 is moved towards the passing hole 10a while overcoming the elasticity of the elastic member 40, the energy of high-speed blow-by gas is reduced. Therefore, there is an advantage in that blow-by gas is prevented from entering the intake hole of the engine in a state in which oil is not separated from the blow-by gas.

In other words, in the second embodiment, in the case where the engine is running at a low speed, the oil separating efficiency can be enhanced by the acceleration of blow-by gas, and, in the case where the engine is running at a high speed, the oil separating efficiency can be enhanced by increasing the area over which the blow-by gas strikes the partition wall 10. Meanwhile, in the variable apparatus of the second embodiment of the present invention, the pressure in a crankcase, into which oil separated from blow-by gas is moved, can be controlled.

In detail, when the engine is running at a low speed, the cover 20 maintains the state of being spaced apart from the passing hole 10a, so that the difference in the pressure of blow-by gas is minimized.

In other words, because the negative pressure difference applied to the blow-by gas is minimized, positive pressure is prevented from being applied to the crankcase. Meanwhile, when the engine is running at a high speed, the difference in pressure of blow-by gas is increased while the blow-by gas overcomes the elasticity of the elastic member 40. This makes it possible to reduce the negative pressure applied to the crankcase to within desired conditions, for example, a predetermined design value.

As describe above, like the first embodiment, the variable apparatus for separating oil from blow-by gas according to the second embodiment can reliably conduct the variable oil separating function using the elastic members 30 having simple structures, even without a separate actuator or controller, such as that used in the conventional art. Furthermore, because the length of the passage along which the blow-by gas contacts the elastic members 30 is variable, the oil separating ability can be markedly increased.

Figure 11:
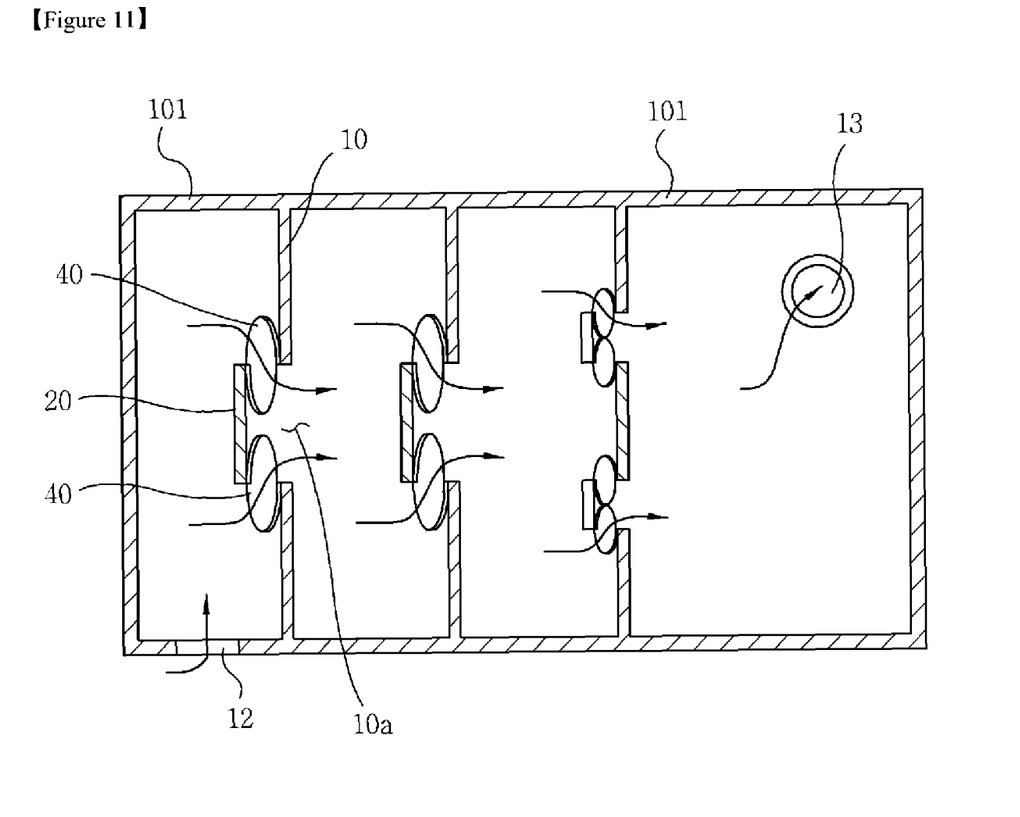
FIGS. 11 and 12 are schematic views showing examples of installation of variable apparatuses for separating oil from blow-by gas in a baffle compartment of the engine according to the second embodiment of the present invention.

Meanwhile, as shown in FIG. 11, in the second embodiment, several partition walls 10 may be provided in a baffle compartment 11, and one or at least two covers 20 and elastic members 30 may be installed in each partition wall 10, in the same manner as in the first embodiment.

Therefore, blow-by gas, which is drawn into the baffle compartment 11 through an inlet 12, passes through the several passing holes 10a of the partition walls 10. During this process, oil is separated from the blow-by gas by the elastic members 30 and the covers 20. Thereafter, the blow-by gas is supplied into an intake system of the engine through an outlet 13 of the baffle compartment 11.

Figure 12:
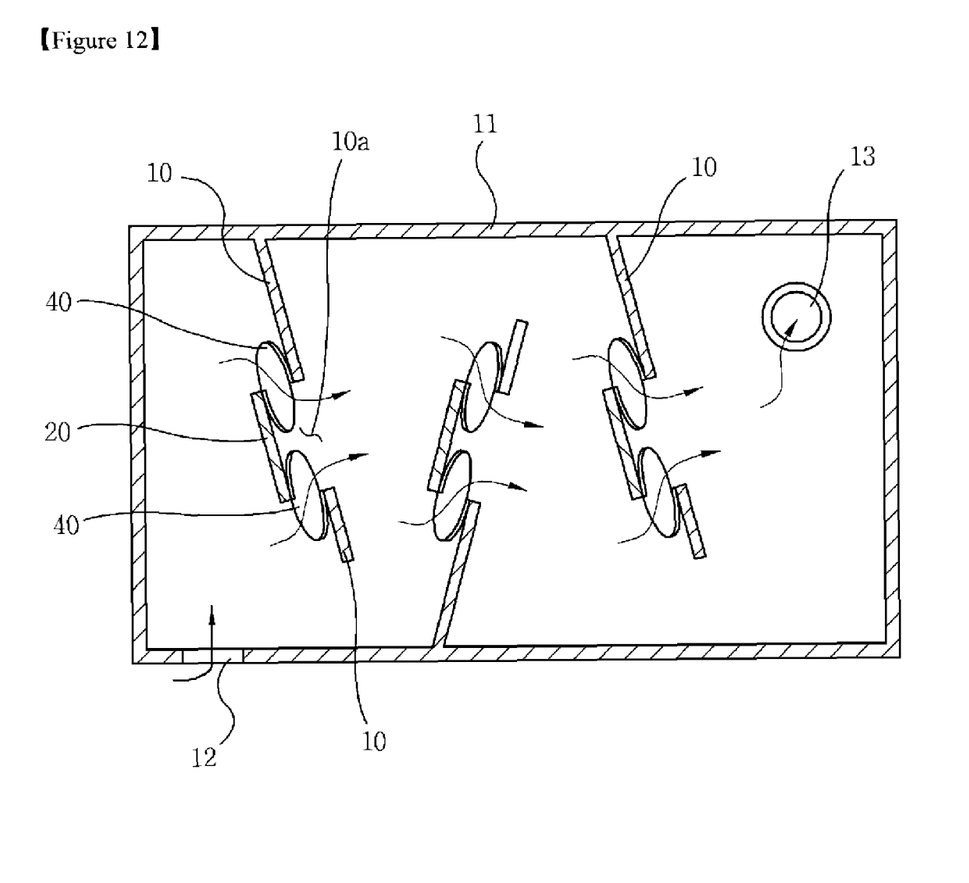

Here, the design of the numbers and the positions of the partition walls 10, the covers 20 and the elastic members 30 may be variously changed depending on the outflow rate of the blow-by gas, the shape of the baffle compartment 11, and the characteristics of the engine. Furthermore, as shown in FIG. 12, as in the first embodiment, partition walls 10 according to the second embodiment of the present invention may be constructed in a baffle compartment 11 in the same manner as that of the partition walls 4 of the conventional baffle compartment 1 of FIG. 1. The covers 20 and the elastic members 30 of the second embodiment of the present invention are installed in such partition walls 10. The variable apparatus for separating oil from blow-by gas according to the second embodiment having the above-mentioned structure is constructed such that, when the engine is operating at low speed, the covers 20 maintain the open state, and, when the engine is operating at high speed, the covers 20 are closed. When the engine is running at a low speed, blow-by gas is accelerated in the state in which the covers 20 are open, thus increasing the efficiency at which oil is separated from blow-by gas.

When the engine is running at a high speed, because blow-by gas flows at high speed, the covers 30 are moved towards the passing holes 10a and thus close the passing holes 10a, so that the area of the partition walls 10 that is struck by the blow-by gas is increased, thereby increasing the efficiency at which oil is separated from blow-by gas.

Industrial Applicability

As described above, the present invention provides a variable apparatus for separating oil from blow-by gas in an engine which appropriately responds to the speed at which blow-by gas flows, so that the efficiency of separation of oil from blow-by gas can be increased even when the blow-by gas flows at a high speed. Furthermore, in the present invention, because an elastic member having a spiral shape has a simple structure and the number of parts is reduced, the reliability of the assembled apparatus is enhanced, the cost of manufacturing the apparatus is reduced, and the durability thereof is markedly enhanced. In addition, in response to the pressure of blow-by gas, the elastic member extends or contracts and thus guides the rotary flow of blow-by gas and, simultaneously, the shape of the contact surface with the blow-by gas is changed, so that the ability to separate oil from blow-by gas can be increased.

The invention claimed is:

1. A variable apparatus for separating oil from blow-by gas in an engine, the variable apparatus being provided in a baffle compartment of a cylinder head cover of the engine, and comprising;
    a partition wall, with a blow-by gas passing hole formed through the partition wall;
    a cover having a shape corresponding to a shape of the blow-by gas passing hole to close the blow-by gas passing hole; and
    an elastic member provided between the partition wall and the cover and made of elastic material, so that the cover is moved away from the partition wall by a predetermined distance depending on pressure of the blow-by gas supplied from the engine, thus defining a passage for the blow-by gas.

2. A variable apparatus for separating oil from blow-by gas in an engine, the variable apparatus being provided in a baffle compartment of a cylinder head cover of the engine, and comprising;
    a partition wall, with a blow-by gas passing hole formed through the partition wall;
    a cover having a shape corresponding to a shape of the blow-by gas passing hole to close the blow-by gas passing hole, and spaced apart from the blow-by gas passing hole by a predetermined distance; and
    an elastic member provided between the partition wall and the cover and controlling a position of the cover using elasticity thereof, wherein, when pressure of the blow-by gas drawn from the engine is increased, the cover is moved to the partition wall, and, when the pressure of the blow-by gas is reduced, the elastic member is returned to an original state thereof so that the cover is moved away from the partition wall.

3. The variable apparatus according to claim 1, wherein the elastic member comprises a spiral elastic plate having a surface twisted into a spiral having a predetermined angle, so that, when the spiral elastic plate is elastically extended, the blow-by gas is spirally rotated under guidance of the spiral elastic plate.

4. The variable apparatus according to claim 3, wherein a flow guide is provided on the twisted surface of the spiral elastic plate to guide the blow-by gas such that the rotary flow of the blow-by gas is further accelerated.

5. The variable apparatus according to claim 1, wherein the elastic member comprises at least two elastic members symmetrically provided on opposite sides of the blow-by gas passing hole of the partition wall.

6. The variable apparatus according to claim 1, wherein the at least one partition wall, the at least one cover and the at least one elastic member are provided in the baffle compartment.

7. The variable apparatus according to claim 2, wherein the elastic member comprises a spiral elastic plate having a surface twisted into a spiral having a predetermined angle, so that, when the spiral elastic plate is elastically extended, the blow-by gas is spirally rotated under guidance of the spiral elastic plate.

8. The variable apparatus according to claim 2, wherein the elastic member comprises at least two elastic members symmetrically provided on opposite sides of the blow-by gas passing hole of the partition wall.

9. The variable apparatus according to claim 2, wherein the at least one partition wall, the at least one cover and the at least one elastic member are provided in the baffle compartment.

* * * * *